2,904,530
Patented Sept. 15, 1959

2,904,530

CURING AGENTS FOR EPOXY RESINS

Robert Steckler, Russell, Ohio, and Gerald Robinson, Forest Hills, and Paul Zimiles, Brooklyn, N.Y., assignors to General Aniline & Film Corporation, New York, N.Y., a corporation of Delaware No Drawing. Application August 17, 1956
Serial No. 604,631

6 Claims. (Cl. 260—47)

This invention relates to epoxy ether resins, and particularly to a new class of curing compositions for said resins.

In order to cure or harden epoxy ether resins and compositions containing them, various types of polyamines, inter alia, have been proposed as curing or hardening agents. The polyamine is simply mixed with the epoxy resin or the epoxy resin composition and the cure or hardening effectuated in the usual manner applicable to such resins.

The polyamines may be divided into three general classes: aliphatic polyamines, aromatic polyamines, and mixed or aralkyl polyamines. Up to the present time, the last mentioned have found little or no use as curing agents. The aliphatic polyamines are popular for several reasons, the most important of which is the fact that the majority of them are liquid, giving them the advantage of being easily incorporated into the epoxy ether resin at room temperature. However, there are several shortcomings attached to their use. For example, they produce crosslinked, cured, resins having rather low heat distortion temperatures. Also, once mixed with the epoxy ether resin, the pot life of the resulting batch is extremely short, usually less than one hundred minutes. On the other hand, aromatic polyamines yield crosslinked resins with rather high heat distortion temperatures, and when initially mixed with the epoxy ether resin yield batches with usable pot life sometimes as high as twenty to twenty-four hours. However, all aromatic polyamines are solids. Thus, in order to disperse them in the epoxy ether resin, unless a solvent is used, which must later be removed, either the polyamine and the resin must be preheated to liquefy both, or the polyamine must be dispersed in the resin by grinding on a suitable mill. This grinding technique to disperse, of course, is both costly and time consuming. The use of heat to liquefy the amine and also to thin out the epoxy resin has the disadvantage that under these advanced conditions the danger of an uncontrollable exothermic reaction is great and, needless to say, the pot life is rather short.

Many attempts have been made to prepare liquid compositions consisting essentially of aromatic polyamines. They have all been unsuccessful because no true liquid eutectic has been found. The compositions that have been prepared are nothing more than supercooled solutions which, although having some stability at room temperature, have a great tendency to crystallize, especially on seeding or handling.

It is an object of the present invention to provide a new mixture of specific aromatic polyamines which cure epoxy resins to a high temperature distortion point.

Other objects and advantages will become manifest from the following description.

We have now found it possible to overcome all the above-mentioned drawbacks of both the aliphatic and aromatic polyamines. We have found a new curing composition comprised essentially of aromatic polyamines. The composition has the advantage of being easily incorporated into the epoxy ether resin at room temperature and yet, since it is essentially all aromatic polyamine, it still gives mixes of long pot life and cured resins of high heat distortion point. Thus, the new composition combines all the advantages of both aliphatic and aromatic polyamines while eliminating all of the foregoing disadvantages.

We have found that we can achieve the aforementioned desirable properties by using essentially a mixture of meta-phenylenediamine and p,p'-methyldianiline. Each is a solid, aromatic polyamine and suffers from the drawbacks previously described. However, when heated together in certain proportions according to our invention these two components form a rather stable extremely fluid liquid. As mentioned before, this is nothing more than a supercooled solution and it does have a rather high tendency to crystallize, especially upon seeding or handling. However, we have found that there is a certain optimum ratio of these two amines that when heated together do give solutions that have a tendency to remain liquid longer than others. We have found that if one employs between 50 and 85% by weight of m-phenylenediamine and between 50 and 15% by weight of p,p'-methylenedianiline and heats the mixture, a rather stable, thin liquid results on cooling. This is rather surprising in view of the fact that if ratios of these two polyamines are used other than those given similar results are not obtained. Any other combination of ratios, either higher or lower, results in unstable, fast crystallizing mixtures.

The liquid composition may be used as such or a third component incorporated in amounts between 1 and 20% by weight per 100 parts by weight of the mixture of polyamines. The preferred mixture is in the range of 60–75% by weight of m-phenylenediamine and 40–25% by weight of p,p'-methylenedianiline and 1–20% by weight of the third component. Through slight variations of experimental procedure we may prepare the composition of our invention either as a liquid or as a paste, both of which show outstanding properties and advantages which heretofore have been unobtainable.

Our liquid composition, which has excellent stability, may be incorporated into the epoxy ether resin at room temperature with the ease of aliphatic polyamine, yet there is no noticeable exotherm produced, and the batch has excellent pot life and heat distortion point usually associated with aromatic polyamines, and a rather low viscosity which makes handling and penetration of the batch excellent.

Our paste composition, which is essentially identical with our liquid composition except for its physical form, gives identical properties. It is indefinitely stable, and may be easily dispersed into the epoxy ether resin at room temperature, in which it dissolves after a short period of time, giving for all intent and purposes the equivalent of our liquid composition in solution.

The third component that is added to the mixture may consist of either aniline, o-, m-, or p-toluidine, o-, m-, or p-chloraniline, N-alkyl aniline, e.g. N-methyl chloraniline, N-ethyl chloraniline, N-propyl chloraniline, etc.; N,N-dialkyl aniline, e.g. N,N-dimethylaniline, N,N-dipropylaniline; trimethylolphenol methyl-, ethyl-, propyl-, or allylether; tetrahydroxyethyl ethylene diamine, etc., or mixtures thereof in amounts of not less than 1% and not more than 20% by weight per 100 parts by weight of the mixture of polyamines.

In addition to the foregoing third components, reaction products of trimethylolphenol or blends thereof with allyl halides, ethylene halohydrine, epichlorohydrine, ethylene oxide, propylene oxide, etc., as outlined in United States Patents 2,579,229–330–331, may also be employed.

The curing compositions prepared in accordance with the present invention are particularly adaptable for the curing of epoxy ether resins characterized by the following general formulae:

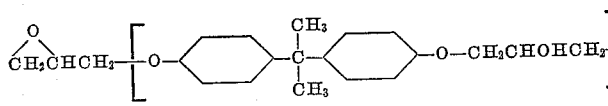

wherein R represents the divalent hydrocarbon radical of a dihydric phenol and *n* represents the extent of copolymerization. The epoxy ether resins have an epoxide equivalent which ranges from 170 to 220, with a viscosity range from Z to Z10. By the term "epoxide equivalent" is meant the grams of the polymeric material or resin containing one gram equivalent of epoxide.

The liquid epoxy ethers are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed for curing with our catalyst compositions.

The following examples will illustrate the application of the blend of the polyamines, with and without the third component, and the results obtained therefrom as curing agents for epoxy resins.

*Example I*

To a one liter, three neck flask, equipped with stirrer, thermometer and condenser, add 490.0 grams m-phenylenediamine and 210.0 grams p,p'-methylenedianiline and heat at 90 to 130° C. for four hours. To 96.0 grams of the above prepared mixture add 4.0 grams aniline with stirring. A rather thin stable liquid is obtained. This mixture is stable to storage for at least four months. 17.0 parts of the above prepared mixture is then stirred into 100 parts of a liquid epoxy resin having an epoxide equivalent of 190–210 at room temperature. There is no noticeable exotherm, and the viscosity of the resulting batch is dramatically reduced. The pot life is in excess of eight hours. Curing the resin by heating at 100° C. for two hours followed by an additional two hours at 150° C. yields a product with a heat distortion temperature of 152° C.

In order to check the effect of the individual component plus the mixture of diamines without the added aniline the following experiments were run.

*Example II*

17.0 grams of m-phenylenediamine, finely divided, were stirred into 100.0 grams of a liquid epoxy resin having an epoxide equivalent of 190–210 at room temperature. The diamine does not appear to dissolve. On heating the diamine dissolves accompanied by a large exotherm yielding an imperfectly cured resin due to localized concentration.

*Example III*

17.0 grams of m-phenylenediamine were heated to 90° C. until liquid, then while hot it was stirred into 100.0 grams of a liquid epoxy resin having an epoxide equivalent of 190–210 at room temperature. The diamine, aside from being difficult to handle because of toxic vapors when hot, crystallized on addition to the epoxy resin. When heated to curing temperatures, a product, imperfect and similar to that of Example II, was obtained.

*Example IV*

17.0 grams of m-phenylenediamine were heated to 90° C. until liquid, then while hot it was stirred into 100.0 grams of a liquid epoxy resin having an epoxide equivalent of 190–210 which had been preheated to 60 to 65° C. The diamine dissolves with evolution of much heat. The exotherm is so violent, in fact, that only small batches may be handled safely. The pot life, due to the exotherm, is of the matter of minutes, which makes it almost unworkable.

*Example V*

17.0 grams of p,p'-methylenedianiline, finely divided, were stirred into 100.0 grams of a liquid epoxy resin having an epoxide equivalent of 190–210 at room temperature. The diamine does not appear to dissolve. On heating, the diamine dissolves accompanied by a large exotherm, yielding an imperfectly curved resin due to localized concentration.

*Example VI*

17.0 grams of p,p'-methylenedianiline were heated to 90° C. until liquid, then, while hot, was stirred into 100.0 grams of a liquid epoxy resin having an epoxide equivalent of 190–210 at room temperature. The diamine, aside from being difficult to handle because of toxic vapors when hot, crystallized on addition to the epoxy resin. When heated to curing temperatures, a product, imperfect and similar to that of Example II was obtained.

*Example VII*

17.0 grams of p,p'-methylenedianiline were heated to 90° C. until liquid, then, while hot, was stirred into 100.0 grams of a liquid epoxy resin having an epoxide equivalent of 190–210 which had been preheated to 60 to 65° C. The diamine dissolved with the evolution of much heat. The exotherm is so violent, in fact, that only small batches may be handled safely. Pot life, due to the exotherm, is of the matter of minutes, which makes it almost unworkable.

*Example VIII*

To a one liter, three neck flask, equipped with stirrer, thermometer and condenser, add 90 parts of m-phenylenediamine, and 10 parts of p,p'-methylenedianiline. The batch is then heated to 90 to 130° C. for four hours. It is then allowed to cool to room temperature with stirring. On cooling this mixture is so unstable that it crystallizes well above room temperature and therefore cannot be used as a liquid.

*Example IX*

To a one liter, three neck flask, equipped with stirrer, thermometer and condenser, add 35 parts of m-phenylenediamine and 65 parts of p,p'-methylenedianiline. This mixture is heated at 90 to 130° C. for four hours. On cooling to room temperature, an extremely viscous mass is obtained. This 35–65 mix must be used immediately, if that is possible, because it crystallizes somewhere between 0 and 100 minutes after cooling to room temperature. This supercooled solution has the tendency to crystallize upon addition to a liquid epoxy resin.

*Example X*

To a one liter, three neck flask, equipped with stirrer, thermometer and condenser, add 490 parts of m-phenylenediamine and 210 parts of p,p'-methylenedianiline and heat at 90 to 130° C. for four hours. Then allow the batch to cool slowly to room temperature. This mixture appears rather stable, but it must be realized that it is essentially nothing more than a supercooled liquid and therefore will turn solid upon handling or seeding. It should be noted that this is the mixture of diamines that falls within the limits of our invention. This is the thinnest viscosity batch that can be prepared from said mixure of diamines and it appears to be the most stable supercooled solution that is possible to obtain.

*Example XI*

To a one liter, three neck flask, equipped with stirrer, thermometer and condenser, add 70 parts of m-phenylenediamine and 30 parts of p,p'-methylenedianiline. This mixture is then heated at 90 to 130° C. for four hours. It is then allowed to cool slowly to room temperature. To 96 parts of the above prepared mixture are added 4.0 parts of trimethylolphenol allyl ether with stirring. A rather thin, stable liquid is obtained which appears stable to storage for at least four months. 17.0 parts of the above prepared mixture was then stirred into 100 parts of a liquid epoxy resin having an epoxide equivalent of 190–210 at room temperature. There is no noticeable exotherm, and the viscosity of the resulting batch is dramatically reduced. The pot life is in excess of eight hours. Curing the resin by normal curing cycles, for example heating at 100° C. for two hours, followed by two to four hours heating at 150° C., yields a product with a heat distortion temperature of 150° C.

*Example XII*

To a one liter, three neck flask, equipped with stirrer, thermometer and condenser, add 70 parts of m-phenylenediamine and 30 parts of p,p'-methylenedianiline. This mixture is heated at 90 to 130° C. for four hours and then slowly allowed to cool to room temperature. To 96 parts of the above prepared mixture add 4.0 parts of tetrahydroxyethyl ethylenediamine. A rather thin, stable liquid is obtained which appears stable to storage for at least four months. 17.0 parts of the above prepared mixture were stirred into 100.0 parts of a liquid epoxy resin having an epoxide equivalent of 190–210 at room temperature. A uniform batch is obtained in which no noticeable exotherm occurs. The viscosity of the resulting batch is dramatically reduced. Pot life is in excess of eight hours. Curing the resin by heating at 100° C. for two hours, followed by four hours at 150° C., yields a product with a heat distortion temperature of 151° C.

*Example XIII*

To 94 parts of a 70–30 mixture of m-phenylenediamine and p,p'-methylenedianiline, add 6.0 parts of trimethylolphenol allyl ether. A rather thin, stable liquid is obtained. This liquid appears stable to storage for at least four months. 17.0 parts of the above prepared mixture were stirred into 100.0 parts of a liquid epoxy resin having an epoxide equivalent of 190–210 at room temperature. There is no noticeable exotherm, and the viscosity of the resulting batch is dramatically reduced. The pot life is in excess of eight hours. Curing the resin by normal curing cycles yields a product with a heat distortion temperature of 148° C.

*Example XIV*

To 90 parts of a 70–30 polyamine mixture add 10.0 parts of tetrahydroxyethyl ethylenediamine. A rather thin, stable liquid is obtained. This mix is stable to storage for at least four months. 17.0 parts of the above prepared mixture was stirred into 100.0 parts of a liquid epoxy resin having an epoxide equivalent of 190–210 at room temperature. There is no noticeable exotherm, and the viscosity of the resulting batch is dramatically reduced. The pot life is in excess of eight hours. Curing the resin by normal curing cycles yields a product with a heat distortion temperature of 147° C.

*Example XV*

To 81 parts of a 70–30 polyamine mixture add 19.0 parts of the trimethylolphenol allyl ether. A rather thin, stable fluid mixture is obtained, which appears indefinitely stable. 20.0 parts of the above prepared mixture were added to 100.0 parts of a liquid epoxy resin having an epoxide equivalent of 190–210 at room temperature. A uniform batch is obtained whose viscosity has been dramatically reduced. No noticeable exotherm occurs, and the pot life is in excess of eight hours. Curing the resin by normal curing cycles yields a product with a heat distortion point of 152° C.

*Example XVI*

To a one liter, three neck flask, equipped with stirrer, thermometer and condenser, add 180 parts of m-phenylenediamine and 20.0 parts of p,p'-methylenedianiline, and heat at 90 to 130° C. with stirring for several hours. While hot add 9.0 parts aniline. This must be done because, as previously described, this composition will crystallize to a solid well above room temperature. However, even in the presence of 9 parts of aniline on cooling this mixture crystallizes almost immediately, and cannot be used as a liquid additive.

*Example XVII*

To a one liter, three neck flask, equipped with stirrer, thermometer and condenser, add 70.0 parts of m-phenylenediamine and 130.0 parts of p,p'-methylenedianiline. The batch is then heated with stirring at 90 to 130° C. for four hours. While hot 9.0 parts of trimethylolphenol allyl ether are added. On cooling to room temperature the batch appears to be extremely unstable and crystallizes almost immediately.

From the foregoing examples, it appears evident that not only is it a requirement that one of the several third components be added to the mixture of diamines to make them stable liquids and usable at room temperature, but also that this mixture of diamines be within a certain specified ratio range. Although it is probably possible to include more than 20% by weight of any of the additives or mixtures thereof, i.e. third component, to this ratio and still get a usable mixture, we prefer to use less than 20% by weight for two reasons. The first, of course, is based on a cost consideration. Also, it is felt that the addition of more than 20% by weight of the polyamines of the additive would result in too great a lowering of the heat distortion point to give a commercially usable product.

The following examples will illustrate how our stable paste compositions are prepared. It should be noted that those compositions and ratios which are unsuitable for making our liquid compositions are also unsuitable for making the paste compositions of our present invention.

*Example XVIII*

To a stable liquid composition, as prepared in Example I, and comprsing 67.2 parts of m-phenylenediamine, 28.8 parts of p,p'-methylenedianiline and 4.0 parts aniline, and 6.0 parts trimethylolphenol allyl ether and a trace of m-phenylenediamine. This composition, which it may be noted is useful as a liquid composition, is now fed into a differential speed three roller mill and after several passes becomes an indefinitely stable, soft buttery paste. 17.0 parts of the above prepared paste are added to 100.0 parts of a liquid epoxy resin having an epoxide equivalent of 190–210 at room temperature. It readily disperses, and within one hour dissolves completely without exotherm, dramatically reducing the viscosity of the epoxy ether resin. It appears identical with the batch prepared in Example I, using our liquid composition. On curing at 100° C. for two hours, followed by four hours at 150° C., a resin is obtained with a heat distortion temperature of 152° C.

*Example XIX*

The paste composition of our invention may also be prepared in the following manner: To a Werner- Pfleiderer, add 67.2 parts of m-phenylenediamine and 28.2 parts of p,p'-methylenedianiline and heat until liquid. Then, let cool slowly to room temperature and add 4.0 parts aniline and 6.0 parts trimethylolphenol allyl ether. Begin agitation and then add a trace of m-phenylenediamine. Continue the mixing for a period of two to three hours. At the end of this time, a paste is obtained, identical in every way with the paste prepared in Example XVIII. It will dissolve in the epoxy ether resin in a short period of time, giving for all intent and purposes the equivalent of our liquid composition. It dramatically reduces the viscosity of the batch which makes handling and penetration excellent. It dissolves, of course, without noticeable exotherm, and produces a batch with a pot life in excess of eight hours. Curing of the resin, using normal heating cycles, results in a produced which has a heat distortion temperature of 152° C.

It should be noted that by using various combinations and ratios of aniline, trimethylolphenol allyl ether, and tetrahydroxyethyl ethylene diamine, etc., within the limit of our invention, gives results which are approximately identical with those obtained in Examples XVIII and XIX.

It should also be noted that by varying the ratios of diamines within the limits of our invention gives satisfactory products also. However, our preferred range is noted to give the highest heat distortion temperatures. All attempts to make pastes of compositions outside the ratios of our present invention resulted in unsatisfactory products.

We claim:
1. A heat curing composition comprising a liquid glycidyl polyether of a dihydric phenol having an epoxide equivalent ranging from 170 to 220 and having incorporated therein a curing amount of a catalyst composition consisting essentially of 81 to 94 parts of a mixture consisting of 70 parts by weight of m-phenylenediamine and 30 parts by weight of p,p'-methylenedianiline and 19 to 4 parts of a compound selected from the class consisting of trimethylolphenol allyl ether and tetrahydroxyethyl ethylenediamine.

2. A heat curing composition according to claim 1 wherein the catalyst composition comprises 4 parts of trimethylolphenol allyl ether and 96 parts of a mixture consisting of 70 parts by weight of m-phenylenediamine and 30 parts by weight of p,p'-methylenedianiline.

3. A heat curing composition according to claim 1 wherein the catalyst composition comprises essentially 4 parts of tetrahydroxyethylenediamine and 96 parts of a mixture consisting of 70 parts by weight of m-phenylenediamine and 30 parts by weight of p,p'-methylenedianiline.

4. A process of hardening a liquid glycidyl polyether of a dihydric phenol having an epoxide equivalent ranging from 170–220 which comprises incorporating in a curing amount in said liquid glycidyl polyether a curing composition consisting essentially of 81 to 94 parts by weight of a mixture consisting of 70 parts by weight of m-phenylenediamine and 30 parts by weight of p,p'-methylenedianiline and 19 to 4 parts by weight of a compound selected from the class consisting of trimethylolphenol allyl ether and tetrahydroxyethyl ethylenediamine.

5. A process according to claim 4 wherein the catalyst composition comprises 4 parts of trimethylolphenol allyl ether and 96 parts of a mixture consisting of 70 parts by weight of m-phenylenediamine and 30 parts by weight of p,p'-methylenedianiline.

6. A process according to claim 4 wherein the catalyst comprises 4 parts of tetrahydroxyethylenediamine and 96 parts of a mixture consisting of 70 parts by weight of m-phenylenediamine and 30 parts by weight of p,p'-methylenedianiline.

References Cited in the file of this patent
UNITED STATES PATENTS
2,801,229    De Hoff et al. _____ July 30, 1957

OTHER REFERENCES
Zonsveld: Jour. of Oil and Colour Chemist's Association, vol. 37, pages 670–75 (1954).